Oct. 16, 1934.   W. F. DIESEL ET AL   1,977,471
LOCKING MECHANISM
Filed Feb. 3, 1932    4 Sheets-Sheet 1

INVENTORS
William F. Diesel
Augustus C. Brown, 3rd.
By Edward H. Cumpston
their ATTORNEY

Oct. 16, 1934.   W. F. DIESEL ET AL   1,977,471
LOCKING MECHANISM
Filed Feb. 3, 1932   4 Sheets-Sheet 2

INVENTORS
William F. Diesel
Augustus C. Brown, 3rd.
By Edward H. Dumpleton
Their ATTORNEY Oct. 16, 1934.    W. F. DIESEL ET AL    1,977,471
LOCKING MECHANISM
Filed Feb. 3, 1932    4 Sheets-Sheet 4

INVENTORS
William F. Diesel
Augustus C. Brown, 3rd.
By Edward H. Cumpston
Their ATTORNEY Patented Oct. 16, 1934

1,977,471

UNITED STATES PATENT OFFICE 1,977,471

LOCKING MECHANISM

William F. Diesel and Augustus C. Brown, 3d, Rochester, N. Y., assignors to Sargent & Greenleaf, Inc., Rochester, N. Y., a corporation of New York Application February 3, 1932, Serial No. 590,670

32 Claims. (Cl. 70—53)

The present invention relates to locking mechanism and has for its object to provide in mechanism of this class, improved means for guarding or protecting a closure or the like, in which the locking mechanism can be released through manipulation of certain parts by different individual operations, distinct one from another.

A further object of the invention is to provide a master combination lock, whereby various similarly constructed locks may be set up for operation by different individual combinations and also successfully operated by a master combination common to all of the locks.

A further object of the invention is to provide a keyless lock of the permutation type embodying individual permutation mechanisms for controlling various forms of locking, securing, or protecting devices and having common operating means for successfully operating one or more combinations of each permutation mechanism without change in the set-up of either of said mechanisms.

A further object of the invention is to provide an improved master combination lock embodying different sets of tumblers, each having fence means individual thereto and arranged to control or obstruct different types of locking, securing, or protecting mechanisms for safes, vaults, lockers, and the like.

A further object of the invention is to provide in a combination lock of the multiple type, for use on closures and the like, means by which to effect a change in one combination which requires that the closure be in open position and the bolt or other protecting means be in advanced or locking position when changing said combination.

A further object of the invention is to provide an improved combination lock arranged for application to the inner face of a closure or the like, and so designed as to require a minimum size opening in the wall of the closure for the reception of an operating element for the lock, such as a spindle and also constructed in such a manner that the spindle may be removed after locking the closure and subsequently inserted when it is desired to effect operation of the combination.

A further object of the invention is to provide a combination lock of the present type embodying comparatively few parts of simple construction which can be manufactured and assembled at a relatively low cost and which are efficient in operation and arranged for control by the manipulation of a single operating element.

To these and other ends the invention resides in certain improvements and combinations of parts, all as will be hereinafter more fully described, the novel features being pointed out in the claims at the end of the specification.

In the drawings.

The same reference numerals throughout the several views indicate the same parts.

The present invention embodies locking or protecting mechanism of the type which can be released through manipulation of suitable operating means, to which different control mechanisms are responsive whereby either of the control mechanisms may be released through different manipulations of the said operating means. Preferably the locking means is of the keyless-combination, or permutation type and the different control mechanisms can be individually operated by suitable means, such for example as a dial or knob on the end of an operating spindle. The different individual manipulations of the operating means can be performed to release either control mechanism without changing the set-up of the other. In other words, where the control mechanisms are of the combination or permutation type as illustrated, either can be brought to release position by the use of an operating member without rendering the other inoperative or incapable of being subsequently released by the successful operation of the combination corresponding thereto.

One application of the present locking or protecting mechanism is to the drawers of school desks, each of which may be provided with the same type of lock, with the different locks set for release by the operation of different individual combinations entrusted to the different students to which the desks are assigned and where all of the locks may be released by the operation of a master combination unknown to the students and entrusted to one or more persons having authority to open the drawers of the various desks from time to time. One advantage of this arrangement is that an officer or attendant when desiring to open the drawers or other closures, instead of having to remember all of the different individual combinations or having to carry a list of the same, may quickly and readily open all of the closures by the operation of the single or master combination entrusted to him.

Figure 3:
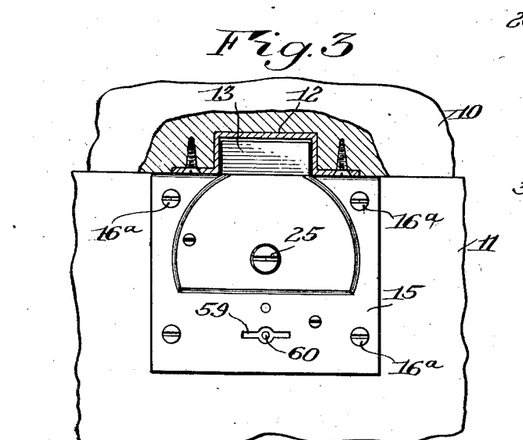
Fig. 3 is a rear elevation partly in section with the bolt shown in locking position within the keeper.
Figure 4:
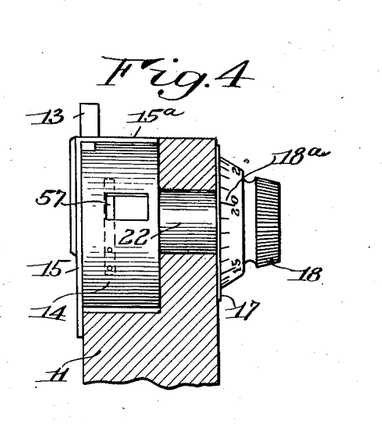
Fig. 4 is a part sectional elevation showing the application of the lock casing and the operating dial to the closure.
Figure 5:
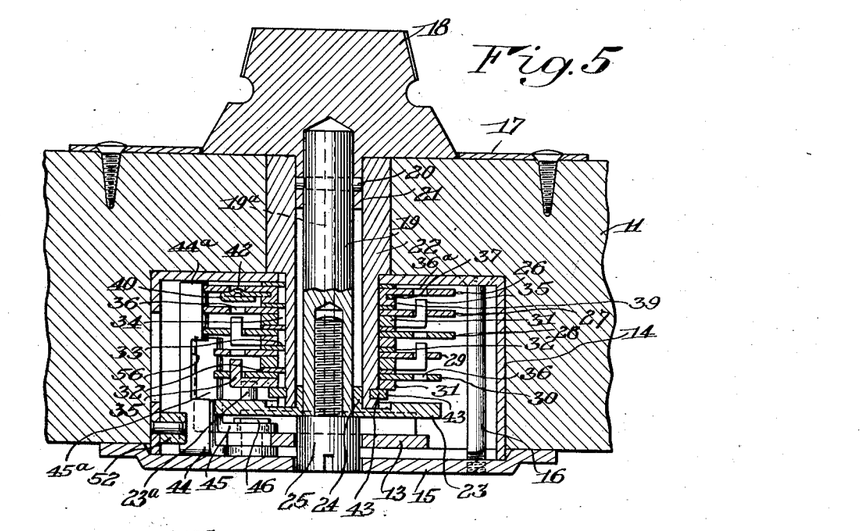
Fig. 5 is a sectional plan drawn to an enlarged scale and taken on line 5a—5a of Fig. 8.
Figure 6:
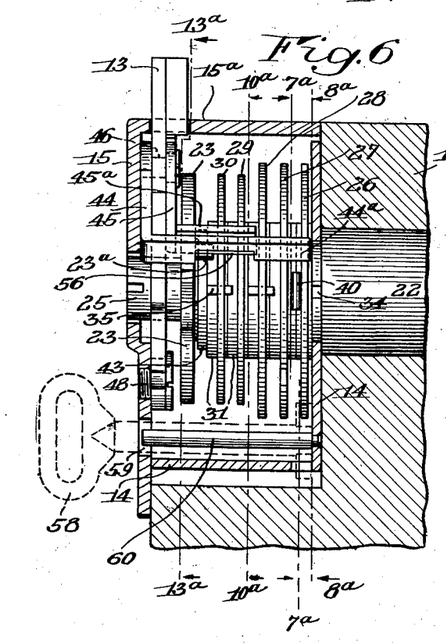
Fig. 6 is a transverse sectional elevation through the lock casing illustrating the relative positions of the fence elements to their respective tumbler mechanisms.
Figure 7:
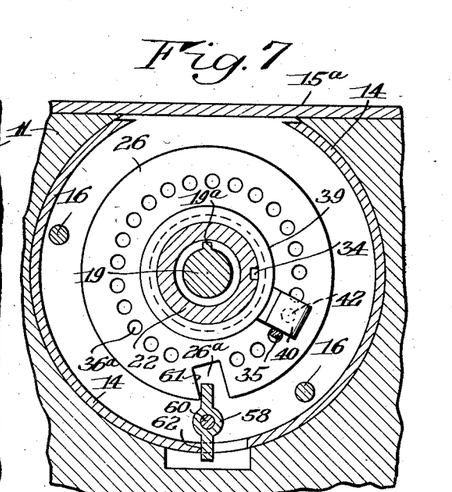
Fig. 7 is a sectional elevation taken substantially on line 7a—7a of Fig. 6.

Referring to the drawings, 10 represents a portion of a receptacle or container of any preferred type having a suitable closure 11 constructed in any desired manner and to which one form of locking mechanism is shown applied as indicated in Fig. 3. In this arrangement the wall of the receptacle is provided with a keeper 12 for receiving the locking bolt 13 of the lock shown. The closure 11 may constitute the drawer of a desk or the door of a locker or any preferred form of protecting means for safeguarding various articles. The closure 11 is recessed at its rear side to receive the locking mechanism as best shown in Fig. 5. The mechanism is carried by a suitable support preferably comprising a casing 14 having a rear cover plate 15 provided with a forwardly extending plate-like portion 15a disposed substantially flush with the top of the closure as shown in Fig. 6 and serving as closing means for the opening formed in the upper wall of the casing proper as indicated in Fig. 7. The cover plate 15 is connected with the casing preferably by means of screw bolts 16, and is also connected with the closure 11 by means of screws 16a as shown in Fig. 3.

The front of the closure is provided with a suitable escutcheon plate 17 having the usual index 17a for cooperation with the characters 18a shown on the dial or operating knob 18 for the control element or spindle 19 which is rotated to effect successful operation of the different tumbler mechanisms as hereinafter described.

The knob 18 is arranged to receive the outer end of the spindle which is connected therewith by a pin 20 disposed within an extension 21 of the knob, which is received within the outer end of the tumbler post 22 suitably anchored in the casing 14. At the opposite end of the post there is provided an operating disk 23 having a hub-like portion 24 rotatably received within the post, said disk also having a pin 23a for rotating the tumblers. The spindle extends through the operating disk and is connected therewith by a screw 25 threaded within the spindle, the head of the screw serving to hold the disk in position upon the rear end of the tumbler post. The spindle is provided with a rib-like portion 19a which takes into a slot 24a in the disk hub 24 whereby rotation of the spindle will effect rotation of the driving disk.

Figures 11, 12, 13, 14, 15:
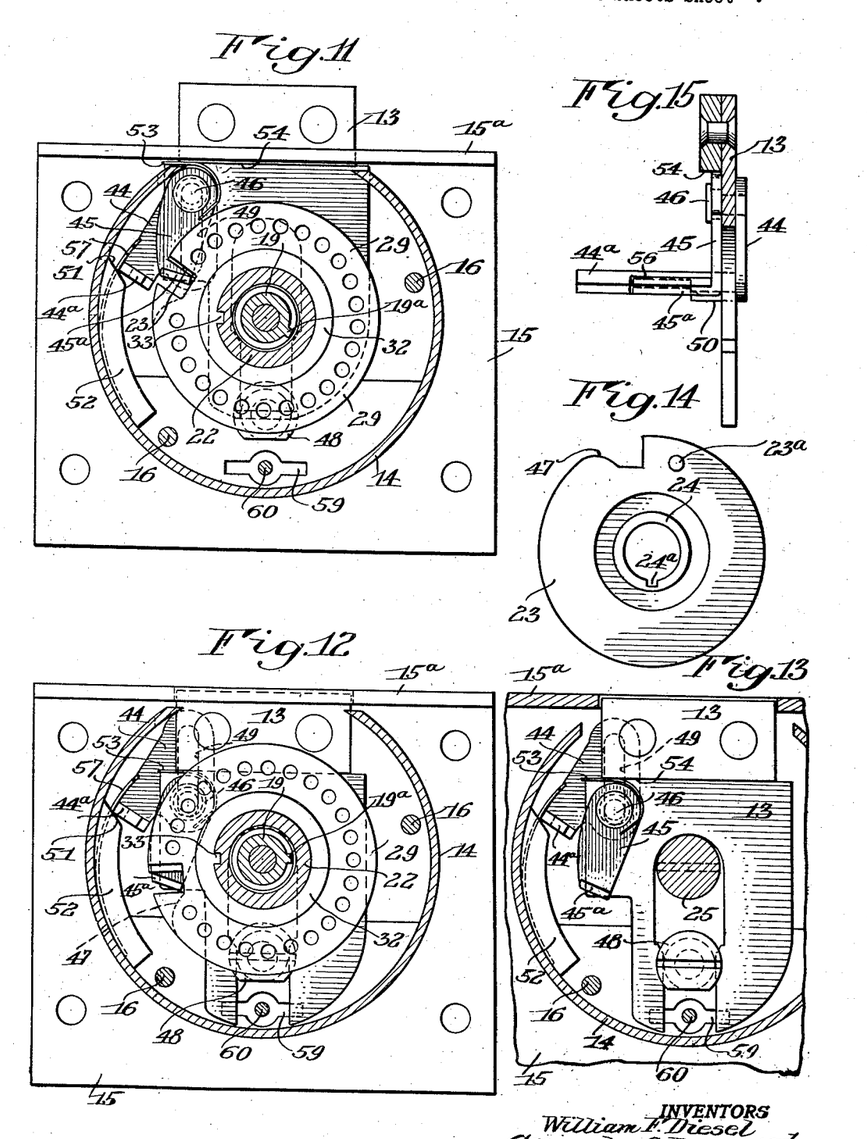
Fig. 11 is a sectional elevation similar to Fig. 10 showing the fence element corresponding to the master combination moved within the notches of the smaller tumblers following successful operation of the master combination.
Fig. 12 is a similar view showing the relationship of the parts after the cam disk has been rotated by turning the dial to retract the bolt by pulling down the fence element extending within the notches of the smaller tumblers.
Fig. 13 is a sectional elevation taken on line 13a—13a of Fig. 6 with the bolt shown retracted following successful operation of the master combination.
Fig. 14 is a front elevation of the cam disk for operating the fence elements.
Fig. 15 is a vertical section through the center of the bolt showing the fence elements supported thereon by a common pivot member.
Figure 16:
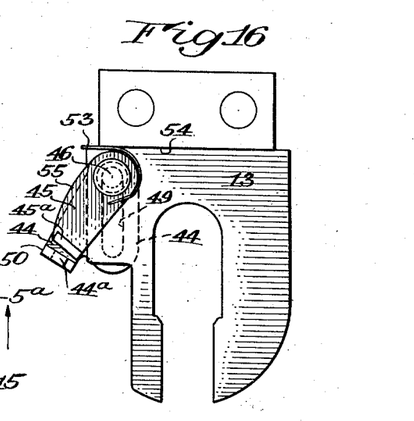
Fig. 16 is a front view of the bolt detached, showing the fence elements thereon.
Figure 18:
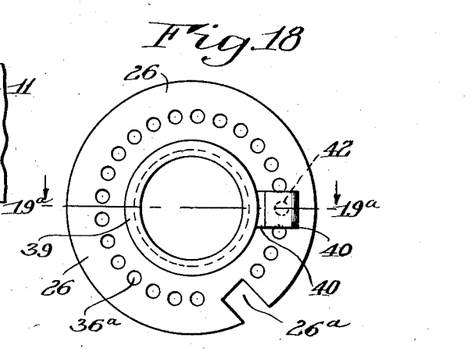
Fig. 18 is a detailed view of the combined tumbler and fly by means of which the individual combination can be changed from time to time by the use of the key shown in Figs. 6 and 7.
Figure 19:
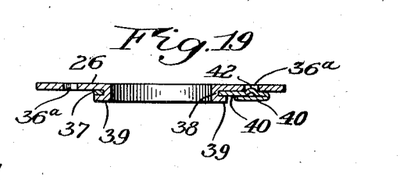
Fig. 19 is a transverse section taken on line 19a—19a of Fig. 18.

Rotatably mounted within the casing 14 on the post 22 are two sets of tumblers of the disk type, one corresponding to the individual combination and the other to the master combination. The tumblers corresponding to the individual combination are indicated at 26, 27, and 28, while those corresponding to the master combination are indicated at 29 and 30, these being of smaller diameter for a purpose which will appear hereafter. The tumblers are operated by similarly constructed flys 31 between which and certain of the tumblers are interposed washers 32 which are held against rotation by means of the tongue-like portions 33 extending within a slot 34 formed in the post 22, as shown in Figs. 5 and 11. The flys are provided with laterally extending lugs 35 which project through openings 36 in the tumbler disks in position to move into engagement with the lugs on the next succeeding flys to operate the tumbler disks corresponding thereto in a manner well understood in the art. However the construction of the front tumbler 26 is somewhat different from the rest, as shown in Figs. 18 and 19, this tumbler being made special to permit one of the combinations to be changed from time to time without removal of the lock from the closure. To this end the tumbler 26 is provided with a fly 37 arranged to rotate on the hub-like portion 38 of the tumbler which carries a retaining flange 39 and which, before application of the fly to the hub, extends at right angles to the face of the tumbler disk, it being understood that after the fly has been inserted upon the hub that the extended portion is turned downwardly to the position shown in Fig. 19 to hold the fly upon the hub. The fly has a laterally extending portion 40 formed of spring material and bent back upon itself to increase the thickness of said portion in order to place it in the path of the lug 35 on the fly associated with the tumbler 27, the lug being shown projecting through one of the openings 36 in said tumbler as indicated in Fig. 5. The spring portion 40 of the fly 37 is provided with a rounded projection 42 extending within one of the openings 36a of the tumbler disk 26, as best shown in Fig. 19. With this arrangement the individual combination can be easily changed by holding the tumbler disk against rotation in a manner described hereinafter, and operating the spindle to drive the operating disk 23 for the purpose of rotating the different tumblers until the lug 35 of the fly associated with the disk 27 catches up with the portion 40 of the fly 37 on the disk 26, as shown in Fig. 7. At this time if rotation of the spindle and the operating disk 23 is continued and the tumbler 26 held against rotation, the fly 37 will be rotated upon the disk, since it is held only by the frictional resistance between the tumbler and the projection 42 on the yieldable portion 40 of the fly. Upon continued rotation of the parts the projection will take into the notches or openings 36a of the disk and these movements, by the sense of touch, can be readily distinguished by the operator, who will turn the dial as many numbers as it is desired to change the combination.

The tumblers and flys after being assembled upon the post 22 are held in position thereon by a split ring 43 which is snapped into a groove formed in the post as shown in Fig. 5.

The bolt 13 has connected therewith a pair of fence elements 44 and 45 arranged to swing upon a common pivot pin 46 secured upon the bolt, said fence elements being pivoted to swing into the notches of the different sets of tumblers upon successful operation of the combination corresponding thereto, the fence elements each also being responsive to a cam 47 on the operating disk 23 to return the bolt to locking position upon destroying the combination as set forth hereinafter.

Figure 8:
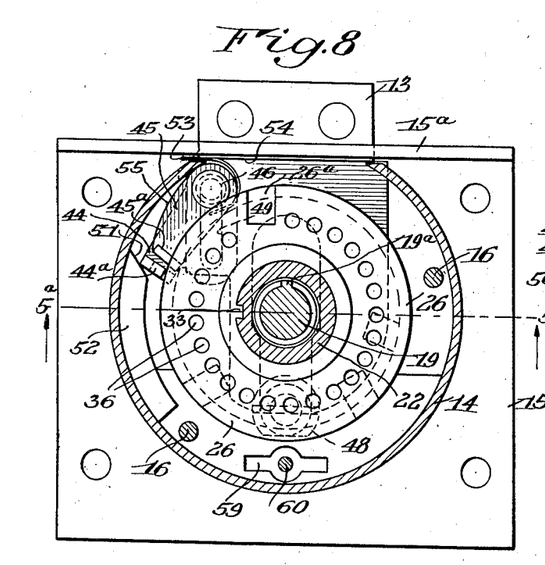
Fig. 8 is a sectional elevation taken substantially on line 8a—8a of Fig. 6 showing the bolt in locking position and the fence elements withdrawn from the notches of the tumblers.

The bolt is forked at its lower end to permit it to straddle the head of the spindle-holding screw 25 and the forked portion is guided by a pin 48 threaded within the rear cover plate 15 of the lock casing as shown in Fig. 6. The upper portion of the cover plate is set back from the bolt to afford space for the rear end of the fence element 44 which is slotted at 49 to receive the pivot pin 46. By thus slotting the fence element, relative movement between the latter and the bolt in a vertical direction is permitted, whereby the bolt may be moved to and from release position upon successful operation of the combination corresponding to one set of tumblers while the other set of tumblers and its fence element remains in non-released or protecting position. With the bolt in locked position as shown in Fig. 8 the portion 50 of the fence 44 will rest on the inclined abutment 51 of a member 52 secured on the inner wall of the casing 14, in which position the fence 45 will cooperate with the fence 44 to support the bolt. In this position of the parts the portion 45a of the fence 45 will rest on the tumbler disks 29 and 30 corresponding to the master combination, while the portion 44a of the fence element 44 will rest on the tumbler disks 26, 27, and 28 corresponding to the individual combination. Assuming that with the parts in this position the master combination is successfully operated by turning the dial knob to bring the notches of the tumblers 29 and 30 into registry, when this is done a spring 53 interposed between an abutment 54 on the bolt and the fence element 45 will swing the latter inwardly to move the portion 45a thereof into the notches of said tumblers as shown in Fig. 11. The bolt can then be moved to the release position shown in Fig. 12, during which time the pin 46 on the bolt will travel downwardly within the slot 49 of the fence element 44, while the latter is held in the position shown in Figs. 11 and 12 by the abutment 51. With the parts in the position shown in Fig. 12 if it is desired to move the bolt to locking position the dial knob is rotated to destroy the combination and the operating disk 23 on the rear end of the spindle is thus rotated so that the cam 47 thereon will be moved into engagement with the part 45a of the fence 45 to return the bolt to locking position. During operation of the cam upon the fence the latter will be swung out of the tumbler notches and cannot re-enter the same until the master combination is again successfully operated. In the raising and outward swinging movement of the fence 45 by the cam, the curved portion 55 of the fence will ride on the portion 50 of the fence 44 whereby the portion 45a is prevented from catching beneath the portion 44a as the parts are raised to the final position shown in Fig. 8.

It will be noted that the fence 44 is cut away at 56 for the purpose of clearing the tumblers 29 and 30 when the fence is moved within the notches of the remaining tumblers by a suitable spring 57 secured to the inner wall of the casing 15.

Figure 9:
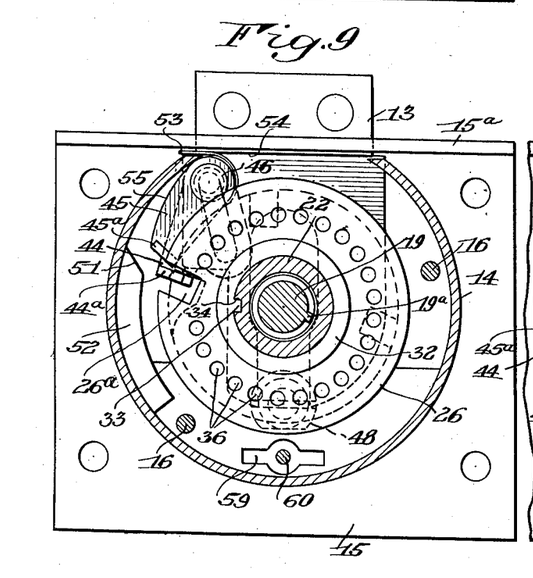
Fig. 9 is a similar view showing the fence element controlled by the individual combination within the notches of the corresponding tumblers after the combination has been successfully operated but before the dial has been turned to retract the bolt.

In the unlocking operation, effected by successfully operating the individual combination by manipulation of the dial knob, the notches of the tumblers 26, 27, and 28 are first brought into registry at which time the portion 44a of the fence 44 will drop into said notches under the action of the spring 57 to the position shown in Fig. 9. Continued rotation of the dial and spindle from this position will cause the tumblers to pull down the bolt to the position shown in Fig. 10 where it remains until it is again desired to lock the closure. The bolt in moving to the release position shown in Fig. 10 will carry with it the fence 45 corresponding to the master combination, which cannot at this time swing into the notches of the tumblers 29 and 30 since they remain out of registry.

Figures 10, 17:
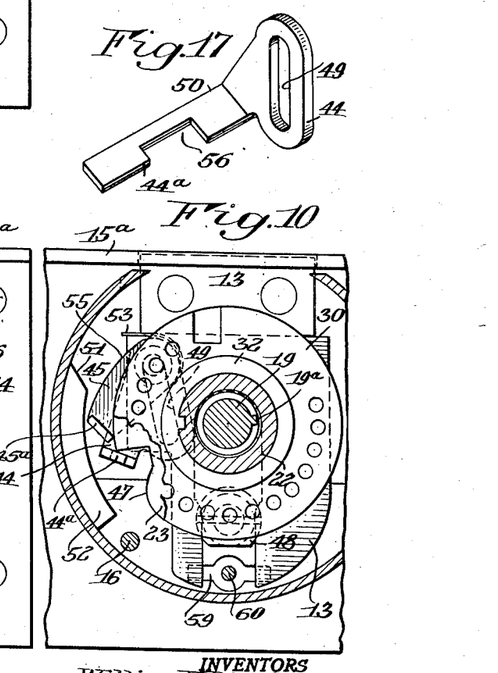
Fig. 10 is a sectional elevation taken on line 10a—10a of Fig. 6 with the smaller tumblers broken away to show the cam disk which has been rotated by turning the dial to pull down the fence lever corresponding to the individual tumbler in order to retract the bolt.
Fig. 17 is a detailed perspective view of the fence element corresponding to the tumblers controlled by the individual combination.

Assuming that it is again desired to lock the closure by moving the parts from the release position shown in Fig. 10, the cam 47, upon rotation of the dial and spindle, will move into engagement with the portion 44a of the fence 44, but since the fence is free to slide on the pivot pin 46 of the bolt it will not serve to raise the latter, except through cooperation of the fence 45. However, when the cam is moved against the fence 44 the latter will engage and move the fence 45 to lift the bolt to locking position. During this time both fence elements will be prevented from swinging outwardly to escape operation by the cam, since they will be held in check by the member 52 until the portion 44a of the fence 44 reaches the inclined abutment 51 on said member. At this time the cam will cause the fence element to swing outwardly to the position shown in Fig. 8 where it will rest on the abutment and in which position it will cooperate with the fence 45 to maintain the bolt in locking position. It will thus be seen that the bolt may be moved to release position by successful operation of either combination, it being understood that the individual combinations of any given series of locks will be different, but that the master combination is common to all of the locks.

Figure 1:
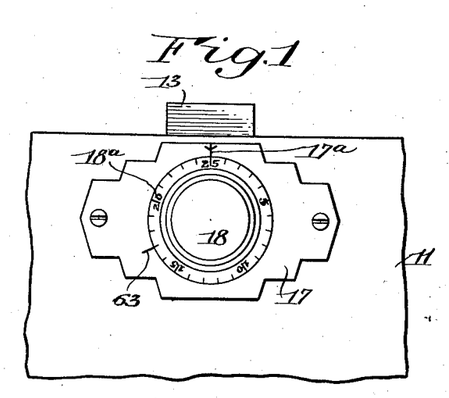
Fig. 1 is a front elevation illustrating one application of the lock to a closure.
Figure 2:
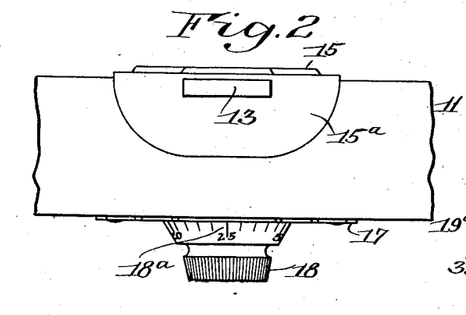
Fig. 2 is a top plan view of the same.

The means by which the individual combination can be changed from time to time without removal of the lock from the closure comprises a change key 58 insertable through an opening 59 in the casing upon a post 60 for operation within the notch 26a of the tumbler 26 whereby to engage the portion 61 of the tumbler and an abutment 62 on the casing to hold the tumbler against rotation while changing the combination. However, before the key can be inserted, the closure must be opened and the bolt advanced from the release position shown in Fig. 12 to the locking position shown in Fig. 11 in order that the lower part of the bolt may clear the key opening 59. When this is done the operation of changing the combination comprises rotating the dial as viewed in Fig. 1 in a clockwise direction at least six revolutions and stopping it with the first number of the combination in registry with an index mark 63 on the escutcheon plate, this number by way of example, being shown on the dial as the seventeenth division. The notch in the tumbler 26 is thus brought to a position slightly to the right of that shown in Fig. 7 in which it will receive the key when the latter is inserted through the slot 59 and given a quarter turn in a clockwise direction as viewed from the rear of the lock. During this time the key will engage the portion 61 of the tumbler and upon completion of the turning operation will occupy the position shown in Fig. 7, in which the key through engagement with the stop 62 on the casing, serves to hold the tumbler against rotation by the spindle when changing the combination. It will be understood that in moving to the position shown in Fig. 7 the key will have shifted the tumbler slightly from the position it occupied when the number 17 on the dial was in registry with the index mark 63 on the escutcheon plate. With the key held in the position shown in Fig. 7 the dial is turned in a clockwise direction as viewed in Fig. 1 as many numbers as it is desired to change the combination. At this time the flys of the different tumblers are in driving engagement one with another so that the special fly 37 will immediately begin to rotate upon the tumbler 26 held by the change key. In thus rotating the parts the operator will, by the sense of touch, be able to tell each time the projection 42 on the fly 37 moves into the different notches 36a of the tumbler 26 and he can thus turn the dial to correspond to as many numbers as it is desired to change the combination. After changing the combination as described, the key is given a quarter of a turn in a counter-clockwise direction as viewed in Fig. 7 to its original position and while in this position the number on the dial in registry with the index 63 is carefully noted since it will constitute the first number of the new combination. The key can then be withdrawn from the lock through the opening 49 in the rear cover plate 15.

If at any time it is desired to forestall an attempt by one or more unauthorized persons to open the drawer by operation of either combination, the screw 25 can be removed from the spindle and the drawer closed and locked by turning the dial to destroy the combination, after which the dial and spindle are withdrawn and taken away. The lock cannot then be operated until the dial is returned and the spindle inserted within the tumbler post with the rib 19 on the spindle extended within the groove 24a of the hub 24 on the operating disk 23, Fig. 14.

By placing the lock casing upon or within the rear portion of the closure 11, only a relatively small opening for the tumbler post is required in the front portion of the closure, thus avoiding the cutting away of the material at this point to any great extent and the consequent weakening of the closure, which would result by placing the lock in a recess formed in the front of the closure in the customary manner.

It will be understood that the master combination can also be changed, but it is preferred to construct the lock so that this cannot be done without either removing parts of the lock or removing the lock from the closure, after which it is desirable to have the change made by someone familiar with the mechanism of the lock. However, the change can best be made by removing the casing from the closure, the cover plate being then removed and also the driving disk 23 and the retaining ring 43. After this is done the tumblers corresponding to the master combination can be withdrawn and one or the other of the flys adjusted to position the lug 35 thereon within a different one of the openings 36 of the adjacent tumbler disk, the lug being shifted a number of holes corresponding to as many numbers as it is desired to change the combination, after which the parts are reassembled and a record of the new combination maintained.

It will be seen, therefore, that the individual tumblers of the two sets provided can be set-up to afford a variety of combinations in each case, and that a change in the combination of one set of tumblers operates in no way to change or destroy the combination of the other set.

It is apparent that the present lock can be made up in relatively large numbers for use on school desks, drawers, lockers, or various forms of enclosures and each lock set up for operation by a different individual combination, which may be known only to those using the desks or other enclosures, each lock also being operable by a master combination whereby an attendant or any authorized person entrusted with the master combination is permitted to open all of the enclosures whenever desired without having to operate the different individual combinations or any but the one master combination.

The construction of the lock and the method of operation will be readily understood from the description given. The operation of the different combinations is the same in each case, that is, by the turn of the dial in the usual manner according to the particular combination relied on to release the lock. So far as the exterior appearance of the lock is concerned there is nothing to indicate that it can be released by the operation of more than one combination.

The provision of a master combination lock which can be operated in the usual manner and in which one combination can be changed without changing or destroying another, affords a highly advantageous lock of the keyless combination type which is applicable as protecting means in connection with various forms of enclosures, particularly where a considerable number of such enclosures are assembled at one or more points under the control of one head or one organization.

While in the present disclosure the combined individual and master combination mechanisms are shown as controlling and protecting means for a locking bolt, it will be understood that the master combination idea is intended to have a relatively wide application as control means for different kinds of protecting devices, either in the form of bolt work or clock mechanism for controlling the same, or other apparatus to be safeguarded and protected against the depredations of unauthorized persons.

From the drawings and description it will be seen that the invention comprises two individual mechanisms for controlling the bolt or other securing means, such for example as the two different sets of tumblers, and that common means for selectively operating the said mechanisms is provided, as for example the combined dial and spindle. While the individual mechanisms shown are of the permutation type it will be understood that the invention is not limited to the use of this particular form of mechanism in each case, since any other type of bolt control means may be associated with one of the permutation mechanisms and the two arranged for selective operation, as in the case of the two sets of tumblers under the control of the dial and spindle.

We claim:

1. Lock mechanism, comprising supporting means, securing means associated with the supporting means, individual control mechanisms for protecting the securing means each being of the permutation type arranged to be separately operated and each including fence means for actuating the securing means, either of said mechanisms when successfully operated effecting release of the securing means and common operating means for said mechanisms.

2. Lock mechanism, comprising supporting means, securing means associated with the supporting means, individual control mechanisms for protecting the securing means each being of the permutation type arranged to be separately operated and each including fence means for actuating the securing means, and common operating means for conditioning said mechanisms to permit the fence means of each to move to release position, said operating means having a part for moving each fence means when in release position whereby to move the securing means to securing position.

3. Lock mechanism, comprising supporting means, locking means associated with the supporting means, control means for the locking means comprising different tumbler mechanisms corresponding to different combinations and each including fence means individual thereto, and common operating means for controlling said tumbler mechanisms effective to condition each upon operation of the combination corresponding thereto whereby either will serve to release said locking means.

4. Lock mechanism, comprising supporting means, securing means associated with the supporting means, individual control mechanisms for protecting the securing means arranged to be separately conditioned to effect release of the securing means, and an operating means arranged to selectively condition said control mechanisms whereby either may be made to release said securing means.

5. Lock mechanism, comprising supporting means, locking means associated with the supporting means, two sets of individual control mechanisms for protecting the locking means either arranged to be operated from protecting to release position without successful operation of the other whereby to effect release of the locking means, and actuating means for said control mechanisms common to each and requiring different operations to effect release thereof.

6. A combination lock, comprising supporting means, individual permutation mechanisms on the supporting means corresponding to different combinations and arranged to control means for protecting a closure or the like, either of said permutation mechanisms when successfully operated effecting release of the control means for protecting the closure and common operating means by which to successfully operate the combinations of said mechanisms one without operation of another.

7. A combination lock, comprising supporting means, individual permutation mechanisms on the supporting means corresponding to different combinations, obstructing means associated with and guarded by said mechanisms arranged to guard protecting means for a closure or the like, either of said permutation mechanisms when successfully operated effecting release of said obstructing means and common operating means by which to successfully operate the combinations of said permutation mechanisms one without operation of another.

8. A combination lock, comprising supporting means, operating means associated with the supporting means, individual tumbler mechanisms carried by the supporting means each under the control of said operating means, said tumbler mechanisms being separately responsive to different combinations capable of being successfully completed by manipulation of said operating means, and locking means under the control of said tumbler mechanisms adapted to be released by the successful operation of the combinations of either of said tumbler mechanisms.

9. A combination lock, comprising supporting means, an operating spindle associated with the supporting means, individual tumbler mechanisms carried by the supporting means each under the control of said spindle, said tumbler mechanisms being separately responsive to different combinations capable of being successfully completed by operation of said spindle, and locking means arranged to be moved by the spindle upon successfully operating either combination.

10. A combination lock, comprising supporting means, an operating spindle associated with the supporting means, individual tumbler mechanisms carried by the supporting means each including fence means, said tumbler mechanisms being separately responsive to different combinations capable of being successfully completed by operation of the spindle, and locking means responsive to the fence means of either tumbler mechanism and each fence means being responsive to the spindle upon successfully operating the corresponding combination.

11. A combination lock, comprising supporting means, operating means associated with the supporting means, individual tumbler mechanisms carried by the supporting means, fence means responsive to the operating means, said tumbler mechanisms being controlled by different combinations capable of being successfully completed by manipulation of said operating means, and locking means under the control of said fence means arranged to be released through operation of said fence means by the operating means after either combination has been successfully operated.

12. A combination lock, comprising supporting means, operating means associated with the supporting means, individual tumbler mechanisms carried by the supporting means, fence means associated with the tumbler mechanisms and responsive to the operating means, said tumbler mechanisms being controlled by different combinations capable of being successfully completed by manipulation of said operating means, and locking means held in locking position by said fence means through cooperation of the latter with the supporting means and arranged to be moved to locking position by the fence means through movement of the latter by the operating means when destroying the combination, the locking means being adapted for release upon successful operation of the combinations of either of said tumbler mechanisms.

13. A combination lock, comprising supporting means, operating means associated with the supporting means, individual tumbler mechanisms carried by the supporting means, fence means associated with the tumbler mechanisms, said tumbler mechanisms being controlled by different combinations capable of being successfully completed by manipulation of said operating means, and locking means held in check by the fence means, the latter being arranged to automatically release the locking means upon the successful operation of either of the combinations.

14. A combination lock, comprising supporting means, operating means associated with the supporting means, individual tumbler mechanisms carried by the supporting means comprising different sets of tumblers each set having fence means individual thereto, said tumbler mechanisms being separately responsive to different combinations capable of being successfully completed by manipulation of said operating means, and locking means under control of each fence means arranged for movement to release position upon movement of either fence means to release position.

15. A combination lock, comprising supporting means, operating means associated with the supporting means, individual tumbler mechanisms carried by the supporting means comprising different sets of tumblers each set having fence means individual thereto, said tumbler mechanisms being separately responsive to different combinations capable of being successfully completed by manipulation of said operating means, and locking means under the control of said mechanisms, the fence means of one set of tumblers operating the locking means under control of one combination, said last mentioned fence means cooperating with the fence means of another set of tumblers to move the locking means under the control of another combination.

16. A combination lock, comprising supporting means, operating means associated with the supporting means, individual tumbler mechanisms carried by the supporting means comprising different sets of tumblers each set having fence means individual thereto, said tumbler mechanisms being separately responsive to different combinations capable of being successfully completed by manipulation of said operating means, and a locking bolt arranged for movement to locking position by the fence means of one of said sets of tumblers under control of said operating means following successful operation of one combination, said last mentioned fence means cooperating with the fence means of a different set of tumblers to move the bolt to locking position following successful operation of another combination.

17. A combination lock, comprising supporting means, operating means associated with the supporting means, individual tumbler mechanisms carried by the supporting means each under the control of said operating means and each including a fence element individual thereto and responsive to said operating means, said tumbler mechanisms being separately responsive to different combinations capable of being successfully operated by manipulation of the operating means, and locking means responsive to one of said fence elements upon movement of the latter by said operating means following successful operation of one combination and cooperating with the fence element of another tumbler mechanism to control the locking means upon movement of the operating means in one direction following successful operation of another combination.

18. A combination lock comprising supporting means, an operating spindle associated with the supporting means, individual tumbler mechanisms carried by the supporting means each under the control of said spindle and each including a fence element, said tumbler mechanisms being separately responsive to different combinations capable of being successfully operated by means of said spindle, and a locking device associated with said fence elements for control thereby arranged for operation by one of the fence elements following operation of one combination and cooperating with the fence element of another tumbler mechanism to move the locking device following the operation of a different combination.

19. A combination lock, comprising supporting means having an abutment thereon, operating means associated with the supporting means, individual sets of tumblers responsive to said operating means each set corresponding to a different combination arranged to be successfully operated by manipulation of said operating means, a locking device, and fence elements individual to said sets of tumblers and cooperating with said abutment to hold the locking device in locking position, each of said fence elements upon successful operation of the combination corresponding to its set of tumblers serving to release said locking device.

20. A combination lock, comprising supporting means having an abutment thereon, operating means associated with the supporting means, individual sets of tumblers responsive to said operating means each set corresponding to a different combination arranged to be successfully operated by manipulation of said operating means, a locking device, and fence elements individual to said sets of tumblers one being pivoted upon said locking device and another movable relative thereto and operating through engagement therewith and with the abutment to hold the locking device in locking position following movement of the operating means to destroy either combination.

21. A combination lock, comprising supporting means having an abutment thereon, operating means associated with the supporting means, individual sets of tumblers responsive to said operating means each set corresponding to a different combination arranged to be successfully operated by manipulation of said operating means, a locking device, and fence elements individual to said different sets of tumblers one being pivoted upon the locking device and another being free to swing and slide thereon, the pivoted fence element being movable by the operating means upon destroying one of the combinations to shift the locking device to locking position independently of the sliding fence element and the latter being responsive to the operating means upon destroying another combination and cooperating with the pivoted fence element to shift the locking device to locking position, said sliding fence element engaging the abutment and cooperating with the pivoted fence element to hold the locking device against release when moved to locking position.

22. A combination lock, comprising a casing, a spindle extending within the casing, individual sets of tumblers arranged to rotate about the axis of the spindle within the casing and each corresponding to a different combination and under control of the spindle, a bolt associated with the casing, and a fence element for each set of tumblers associated with the bolt, one of the fence elements being arranged for operation by the spindle independently of the other to shift the bolt to locking position upon destroying one combination, and another fence element being arranged to cooperate with the last mentioned fence element under control of the spindle to shift the bolt to locking position upon destroying another combination.

23. A combination lock, comprising a casing, a spindle extending within the casing, individual sets of tumblers arranged to rotate about the axis of the spindle within the casing and each corresponding to a different combination under control of the spindle, a bolt associated with the casing, and a fence element for each set of tumblers associated with the bolt, one of the fence elements being pivoted upon the bolt and arranged to be operated by the spindle upon destroying one combination whereby to shift the bolt to locking position, and another fence element being arranged for a swinging and sliding movement upon the bolt and adapted to be actuated by the spindle and to cooperate with the last mentioned fence element to shift the bolt to locking position upon destroying another combination.

24. A combination lock, comprising a casing having an abutment thereon, a spindle extending within the the casing, individual sets of tumblers free to rotate about the axis of the spindle within the casing, a bolt slidable upon the casing, a fence element individual to each set of tumblers, one of the fence elements being arranged for operation by the spindle to shift the bolt to locking position and a second fence element being movable relative to the first and arranged for cooperation therewith and for operation by the spindle to shift the bolt to locking position, said second fence element being supported by the abutment in the locked position of the bolt and cooperating with the other fence element to support the bolt in locked position.

25. A combination lock, comprising a casing having an abutment thereon, a spindle extending within the casing having a dial on its outer end, individual sets of tumblers free to rotate about the axis of the spindle and corresponding to different combinations, a cam element on the spindle operatively associated with the tumblers, a bolt movable upon the casing, a fence associated with one set of tumblers and pivotally connected with the bolt, and a second fence associated with a different set of tumblers and mounted to slide upon the bolt and to swing about the pivotal axis of the last mentioned fence, said pivoted fence being arranged for operation by the cam element to move the bolt to locking position upon rotating the spindle to destroy one combination, and the second fence operating to move said first fence whereby to shift the bolt to locking position upon rotating the spindle to destroy another combination, one fence engaging the abutment and cooperating with the other fence to hold the bolt against release when moved to locking position.

26. In locking mechanism, supporting means, a closure securing element movable to securing position upon the supporting means, individual sets of notched tumblers on the supporting means corresponding to different combinations, one set serving as operating means for another set, fence elements individual to said tumbler sets mounted on and adapted to operate the securing element, and means for operating the fence elements adapted to actuate the operating set of tumblers to aline its notches or those of another set whereby to permit the fence elements corresponding to each set to move into the notches thereof.

27. In locking mechanism, supporting means, a tubular bearing connected with the supporting means, individual sets of notched tumblers free to rotate upon said bearing corresponding to different combinations, one set serving as operating means for another set, fence elements individual to said tumbler sets arranged for the protection of closure securing means, a spindle journaled in said bearing, and means on the spindle arranged to control said fence elements and to actuate the operating set of tumblers to aline its notches or those of another set whereby to permit the fence elements corresponding to each set to move into the notches thereof, the securing means being adapted for release upon successful operation of the combination of either of said sets of tumblers.

28. In locking mechanism, supporting means, a tubular bearing secured upon the supporting means, a locking element movable upon the supporting means, individual sets of notched tumblers free to rotate upon said bearing corresponding to different combinations, one set serving as operating means for another set, fence elements individual to said tumbler sets arranged to shift said locking element, a dial having a spindle thereon journaled in said bearing, and means on the spindle for shifting said fence elements and for actuating the operating set of tumblers to aline the notches thereof or those of another set whereby to permit the fence elements of each set to move into the notches thereof.

29. In locking mechanism, a closure, a lock casing secured to the wall of the closure inwardly thereof, locking means associated with the casing, a tubular post extending within the casing, said closure having a relatively small bore alined with the bore of the post, a dial disposed outwardly of the closure and having a spindle rotatably received within said bores, control means for the locking means comprising different tumbler mechanisms mounted on the post each of the permutation type and corresponding to different combinations, and means on the spindle for operating and controlling said tumbler mechanisms effective to condition each upon operation of the combination corresponding thereto whereby either will serve to release the locking means, the spindle with the dial thereon being detachably associated with said operating means for withdrawal from the closure, said tumbler mechanisms being inaccessible for operation from the exterior of the closure when in locked position after withdrawal of the spindle except by reinsertion of the spindle within the bores.

30. In locking mechanism, supporting means, a closure securing element movable to securing position upon the supporting means, individual sets of notched tumblers on the supporting means corresponding to different combinations, one set serving as operating means for another set, fence elements individual to said tumbler sets mounted on the securing element, one of the fence elements being operable to actuate the securing element when the combination of one set of tumblers is successfully operated, and another fence element being adapted for cooperation with the last mentioned fence element to actuate the securing element when the combination of another set of tumblers is successfully operated and a device for actuating the operating set of tumblers to aline its notches or those of another set whereby to permit the fence elements corresponding to each set to move into the notches thereof, said device serving also to operate the fence elements to actuate the securing element.

31. In combination, a closure protecting element, individual permutation mechanisms corresponding to different combinations, cooperating control devices for obstructing and operating the protecting element one corresponding to each permutation mechanism each of the control devices when the combination of the permutation mechanism corresponding thereto is successfully operated serving to release the protecting element, and common operating means by which to successfully operate the combinations of each of said permutation mechanisms, said operating means when one of the combinations is destroyed operating through the control device corresponding to said combination to effect shifting of the protecting element to protecting position, said operating means when another of the notches is destroyed operating through its corresponding control device and the last mentioned control device to shift the protecting element to protecting position.

32. Lock mechanism comprising supporting means, a locking bolt associated with the supporting means, individual tumbler mechanisms for protecting and releasing the locking bolt, means for selectively operating said tumbler mechanisms including a driving disk having a notch therein, and fence elements for releasing the bolt individual to said tumbler mechanisms each fence element taking into the notch of the driving disk upon successful operation of its corresponding combination.

WILLIAM F. DIESEL.
AUGUSTUS C. BROWN, 3D.